No. 897,610. PATENTED SEPT. 1, 1908.
R. I. FANCHER.
FLEXIBLE POWER TRANSMITTING MECHANISM.
APPLICATION FILED MAR. 23, 1906.
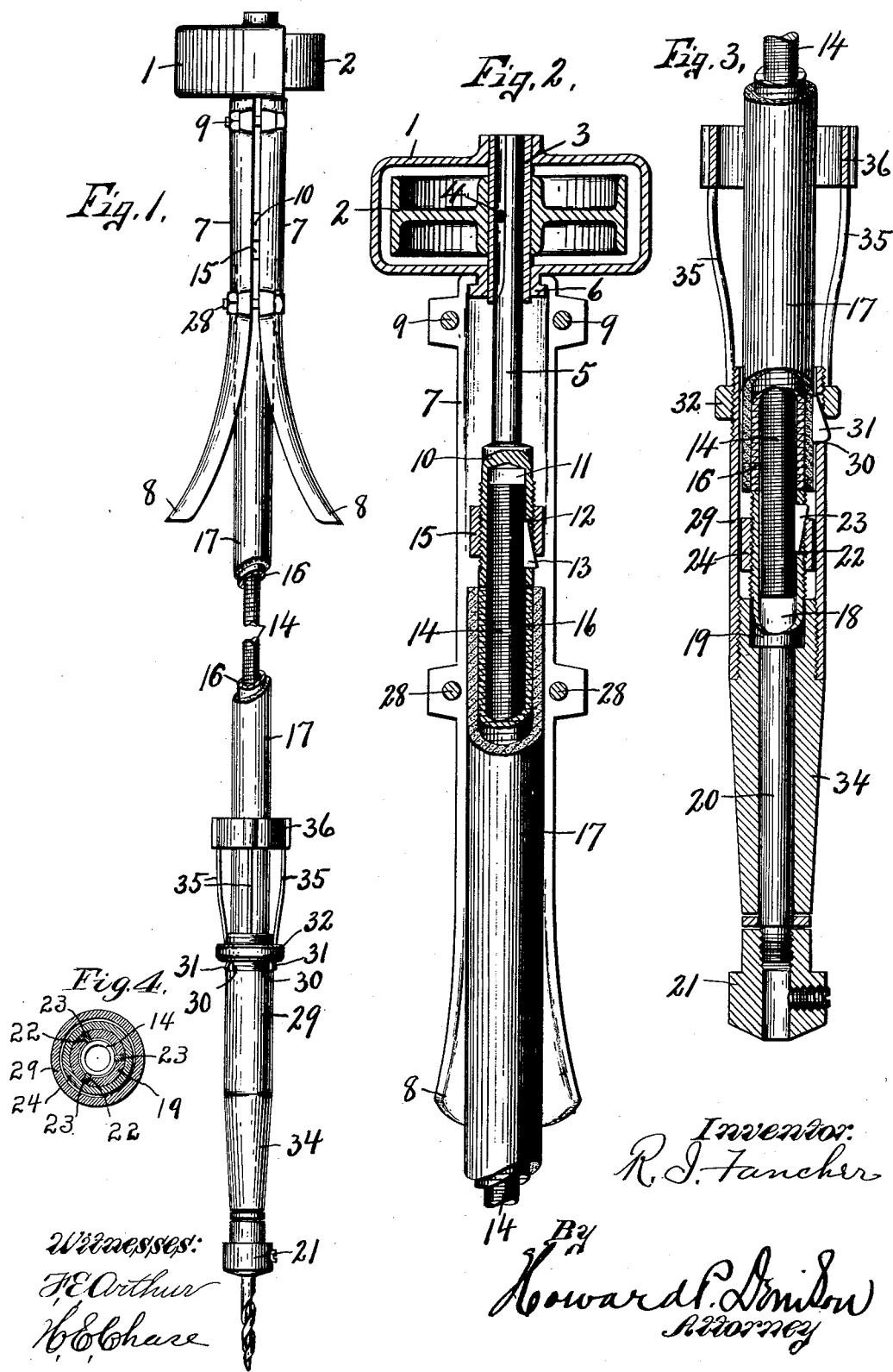

UNITED STATES PATENT OFFICE.

ROSMAN I. FANCHER, OF BALDWINSVILLE, NEW YORK.

FLEXIBLE POWER-TRANSMITTING MECHANISM.

No. 897,610.          Specification of Letters Patent.          Patented Sept. 1, 1908.

Application filed March 23, 1906. Serial No. 307,629.

*To all whom it may concern:*

Be it known that I, ROSMAN I. FANCHER, of Baldwinsville, in the county of Onondaga, in the State of New York, have invented new and useful Improvements in Flexible Power-Transmitting Mechanism, of which the following, taken in connection with the accompanying drawings, is a full, clear, and exact description.

This invention relates to certain improvements in flexible power transmitting mechanism comprising essentially a flexible shaft rotatingly mounted within and extending through a flexible metal casing, which is sheathed throughout its entire length in a pliable jacket of comparatively heavy leather, or equivalent material. In this class of devices, one end of the flexible shaft is connected to a suitable driving element, while the other end is connected to a tool holder or other driven element which it may be desired to shift from place to place within the range or sweep of the working end of the shaft. It, therefore becomes necessary to rigidly connect the terminal ends of the flexible shaft to the driving and driven elements, and this is usually done by brazing said terminal ends to certain rigid parts of the driving and driven mechanisms, but it is found that after a longer or shorter period of use, according to the strains to which the shaft is subjected, they almost invariably break at or near their brazed junctions with the adjacent parts of said mechanisms, which makes it necessary to not only replace the shaft, but also the terminal connections by which the shaft is attached to the driving and driven mechanisms.

The flexible shaft usually consists of a tempered coiled spring, and when brazed in the manner just described, the temper is, of course, destroyed, and renders the terminal ends of the shaft more susceptible to breakage. The helices at the extreme ends of these coil-spring flexible shafts are rigidly secured to each other by brazing or equivalent securing means to prevent uncoiling, and the heat which is necessarily applied in the process of brazing anneals to a greater or less degree the spring or destroys the life of the wire forming the coil, and heretofore these extreme ends which have been previously weakened by brazing have been rigidly fastened to the driving and driven elements so that the points of attachment have always been at the weakest point of the shaft causing frequent breaking at these points. My object, therefore, is to clamp the ends of the shaft to their respective heads beyond the points which are weakened by heating in the operation of brazing so that the strain of the connection between the shaft and head is applied to the stronger portions of the shaft which have not been affected by the heat.

One of the principal objects of my invention is to frictionally lock the terminal ends of the flexible shaft to the adjacent parts of the driving and driven mechanisms so as to avoid the disadvantages of brazing, thereby reducing the liability of breakage, and at the same time affording means for readily removing the broken parts and replacing them with new ones, or permitting the re-insertion of the end of the broken shaft into the adjacent connection after the broken terminal has been removed therefrom.

A further object of this detachability of the heads is to permit the shaft to be readily withdrawn from its casing separately from the heads to be lubricated.

Another important feature of my invention is to frictionally secure the terminals of the casings and its leather jacket to the non-rotatable supports for the driving and driven elements, thereby avoiding direct contact of the threaded collars and similar clamping devices with the leather, which tends to cause undue abrasion and mutilation of the leather, and after a short period of time allows the jacket to work loose from its attaching elements.

Other objects and uses will appear in the following description.

In the drawings—Figure 1 is an elevation of a flexible power transmitting mechanism showing the terminal connections of a flexible shaft with its driving and driven elements. Figs. 2 and 3 are enlarged longitudinal sectional views, partly in elevation, showing in Fig. 2, the driving mechanisms and connections with the adjacent terminal end of the driving shaft, together with means for securing the adjacent ends of the casing and the jacket against rotation; while in Fig. 3, I have shown the driven mechanism as a drill chuck and chuck-holder, each attached respectively to the flexible shaft and its casing. Fig. 4 is a transverse sectional view through one of the shaft couplings showing a plurality of clamping jaws.

In order to clearly demonstrate the practicability of my invention, I have shown a non-rotatable overhead supporting frame —1— for a driving pulley, as —2—, having a hollow shaft —3— journaled in the frame —1— and provided with a key —4— which interlocks with the flat side of one end of a rigid driving shaft section —5—.

The non-rotatable frame —1— may be secured to any suitable support, in such position as to enable the pulley —2— to be connected to any available power transmitting mechanism, not necessary to herein illustrate or describe, and in this instance it is provided with a depending flange or boss —6—, upon which is clamped a split sleeve consisting of opposite similar half sections —7— which are each formed with a laterally flaring lower end —8— and are clamped together upon the boss —6— by clamping bolts —9—.

The shaft-section —5— extends downwardly within and between the sleeve-sections —7— and is formed with an enlarged lower end or head —10— having a smooth-bore socket —11— and a series of, in this instance three, elongated radial slots —12— spaced equidistant apart and extending through its sides for receiving a corresponding number of tapering or wedge shape jaws —13— having portions of their outer faces protruding beyond the periphery of the head and their inner faces bearing against the terminal end of a flexible shaft —14— which is inserted into the socket —11— of the head —10—. This head —10— is threaded exteriorly and is engaged by a threaded collar 15—, the function of which is to compress the jaws 13— upon the adjacent end of the flexible shaft —14— to frictionally lock said flexible shaft to its driving section —5—. The smaller ends of the tapering jaws 13— are within the periphery of the head —10— while the larger ends protrude some slight distance beyond said periphery, and by screwing the collar —15— in one direction, it is moved across the slots —12— and simultaneously engages and compresses the jaws 13— against the periphery of the flexible shaft 14—, and by rotating the collar in the opposite direction, it is moved upward to uncover the slots —12— and relieve the pressure of the jaws 13— upon the flexible shaft, whereupon the latter may be readily withdrawn from the socket —11—.

The flexible shaft 14— is inclosed in a flexible metal casing —16—, which in turn, is sheathed in a suitable jacket —17— of leather or equivalent material, said casing and jacket being substantially co-extensive with the length of the shaft 14— except that the terminal ends of the shaft project slightly beyond the ends of the casing and jacket for connection with the adjacent parts of the driving and driven mechanisms. The opposite or working end of the flexible shaft 14— is seated in a similar socket —18— in a rotary head —19— of a driven shaft-section —20— upon the lower end of which is screwed a suitable tool holding-chuck —21—.

The head —19— of the driven shaft section —20— is threaded exteriorly and provided with a series of, in this instance three, radial slots —22—, for receiving a corresponding number of wedge-shaped jaws —23—, said threaded head being engaged by a threaded collar —24— operating upon the jaws —23— to compress them into frictional engagement with the adjacent terminal end of the flexible shaft 14—.

The head —19—, jaws —23— and collar —24— are similar to the parts —10—, 13— and 15— for securing the upper end of the shaft to the driving mechanism, and it is now clear that both ends of the flexible shaft are frictionally locked respectively to the driving shaft section —5— and driven shaft section —20—, and may be readily detached by simply unscrewing the collars 15— and —24— to release the pressure of the jaws 13— and —23— upon the periphery of the flexible shaft. These jaws fit closely within their respective slots and are, therefore, held against circumferential or endwise movement, but may be readily removed radially by unscrewing the collars 12— and —24— to uncover their respective slots. By this frictional interlocking of the terminal ends of the flexible shaft to their respective driving and driven shaft sections —5— and —20—, I avoid the expense and disadvantages of brazing and at the same time the flexible shaft may be supplied without extra fittings and quickly connected to the driving and driven shaft sections by simply inserting their terminal ends in their respective sockets and screwing the collars —12— and —24— against the wedge-shape jaws —13— and —23—.

The upper terminal end of the shaft casing —16— and its jacket —17— is frictionally clamped and held between the sleeve sections —7— by suitable clamping bolts —28— which are located some distance above the lower flaring ends —8— to allow for a limited flexing action of this end of the casing —16— and its jacket —17— together with the inclosed rotating shaft 14—. The lower terminal end of the casing —16— and its jacket —17— is inserted in one end of a sleeve or ferrule —29— having a series of, in this instance three, radial slots 30—, for receiving tapering jaws —31— which are compressed against the periphery of the leather jacket —17— by means of a threaded collar —32— engaging the adjacent threaded end of the sleeve or ferrule —29—. The opposite end of this ferrule is threaded interiorly and receives a reduced threaded end of a non-rotatable handle or cylindrical bearing —34— for the driven shaft section —20—.

The slots —30— are of substantially the same dimensions as the outer dimensions of the jaws —31—, and therefore, these jaws are held against circumferential or endwise movement by the walls of the slots —30—, but are removable radially through said slots when the collar —32— is unscrewed to relieve the pressure of the jaws upon the leather jacket. The inner faces of all of these gripping jaws are preferably smooth, and thereby prevent abrasion of the parts with which they come in contact, which is particularly important in the connections between the leather jacket and sleeve or ferrule —29— because it enables the lower terminal end of the non-rotatable casing and its leather jacket —17— to be readily attached to or detached from the sleeve or bearing section for the driven shaft —20—.

The collar —32— is connected by lengthwise spring arms —35— to a ring —36— which has a greater interior diameter than the outer diameter of the leather jacket —17— to allow limited flexing action of the shaft and its inclosing casing and jacket, and at the same time serves to prevent short bends or kinks at the junction of the flexible connections with the rigid non-rotatable casing for the driven elements.

It will be observed that the upper end of the jacket —17— and its inclosing casing —16— are frictionally clamped and held against rotation between the sleeve sections —7— which, in turn, are frictionally clamped to the hub —6— of the non-rotatable frame —1—.

It now appears that the essential features of my invention are, first, frictionally clamping the terminal ends of the flexible shaft to the driving and driven elements respectively, and second, frictionally clamping the terminal ends of the casing and jacket sections to the non-rotating supports for the driving and driven elements.

What I claim is:

1. In a flexible power transmitting mechanism, a rotary head having radial slots and a socket extending inwardly from one end beyond the slots, wedge-shape jaws movable radially in said slots, a flexible shaft having the helices at one end secured together and inserted into said socket beyond the jaws, a non-rotatable casing of closely coiled wire inclosing the intermediate portion of the shaft, a leather jacket surrounding the casing, a non-rotatable sleeve loosely inclosing the aforesaid head and adjacent end of the jacket, and movable means for rigidly clamping the sleeve to said jacket.

2. In a flexible power transmitting mechanism, a revoluble spindle having a socket in one end, a coil-wire shaft having its helices at one end brazed together and inserted in said spindle socket, jaws in the spindle engaging the shaft some distance from the brazed helices, means for operating said jaws, a non-rotatable coil-wire casing for said shaft, a leather jacket for the casing, and non-rotatable holding means clamped to one end of the jacket.

In witness whereof I have hereunto set my hand this 19th day of March 1906.

ROSMAN I. FANCHER.

Witnesses:
H. E. CHASE,
HOWARD P. DENISON.